(12) United States Patent  
Oohira

(10) Patent No.: US 8,319,909 B2  
(45) Date of Patent: Nov. 27, 2012

(54) LIQUID CRYSTAL DISPLAY DEVICE

(75) Inventor: Eiji Oohira, Mobara (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 299 days.

(21) Appl. No.: 12/379,282

(22) Filed: Feb. 18, 2009

(65) Prior Publication Data  
US 2009/0231507 A1 Sep. 17, 2009

(30) Foreign Application Priority Data

Mar. 12, 2008 (JP) ................................. 2008-062370

(51) Int. Cl.  
G02F 1/1333 (2006.01)
(52) U.S. Cl. .......................................................... 349/58
(58) Field of Classification Search ...................... 349/58  
See application file for complete search history.

(56) References Cited

U.S. PATENT DOCUMENTS

2005/0122587 A1* 6/2005 Ouderkirk et al. ............ 359/490  
2005/0200770 A1* 9/2005 Kuo et al. ......................... 349/58  
2007/0019127 A1 1/2007 Oohira  
2007/0139583 A1 6/2007 Meijers et al.

FOREIGN PATENT DOCUMENTS

| CN | 101075038 A | 11/2007 |
| JP | 2007-25484 | 2/2007 |
| JP | 2007-025484 | 2/2007 |

* cited by examiner

Primary Examiner — Timothy L Rude  
(74) Attorney, Agent, or Firm — Stites & Harbison, PLLC; Juan Carlos A. Marquez, Esq

(57) ABSTRACT

A liquid crystal display (LCD) device employs a lower polarization plate structure thinner than conventional devices. The device comprises: a LCD panel including first and second substrates, and liquid crystal between the first and second substrates; and a backlight on the first substrate side of the panel. The backlight includes a frame-like mold frame and an optical sheet inside the mold frame. The LCD panel is adhered to the mold frame by double-sided tape, and includes a lower polarization plate on the first substrate's surface. The double-sided tape is adhered to a peripheral portion of the first substrate on one side, and to the mold frame and a peripheral portion of the optical sheet on the other. Where A is the thickness of the double-sided tape and B the thickness of the lower polarization plate, A>B. The difference A−B satisfies $0 < A-B < 50\ \mu m$.

8 Claims, 7 Drawing Sheets

LIQUID CRYSTAL DISPLAY DEVICE

CROSS-REFERENCE TO RELATED APPLICATION

The disclosure of Japanese Patent Application No. 2008-62370 filed on Mar. 12, 2008 including the specification, drawings and abstract is incorporated herein by reference in its entirety.

BACKGROUND OF THE INVENTION

1. Field of the Invention

The present invention pertains to a liquid crystal display device and particularly relates to a technology that is effectively applied to a compact liquid crystal display device.

2. Description of the Related Art

Thin-film transistor (TFT) liquid crystal display devices that include a compact liquid crystal display panel that is a color display and whose number of sub-pixels is about 240× 320×3 are widely used as display portions in mobile devices such as mobile telephones.

Usually, a liquid crystal display device includes a liquid crystal display panel and a backlight that illuminates the liquid crystal display panel with light, but in a liquid crystal display device that is used as a display portion in a mobile device such as a mobile telephone, the back light is configured by a resin mold frame (below, called a "mold"), an optical sheet group and a light guide plate that are disposed inside the mold, and a reflection sheet that is disposed on the underside of the light guide plate.

In recent years, a structure where the bottom surface of the mold is omitted is becoming mainstream among liquid crystal display devices for mobile telephones due to the demand to make the liquid crystal display devices thin (see patent citation 1 (Japanese Patent Application Laid-Open Publication No. 2007-25484)).

FIG. 8A, FIG. 8B, FIG. 9A and FIG. 9B are cross-sectional diagrams of relevant portions showing conventional structures of a liquid crystal display device. FIG. 8B and FIG. 9B are diagrams showing a cross-sectional structure on a long side, and FIG. 8A and FIG. 9A are diagrams showing a cross-sectional structure on a short side where a semiconductor chip is mounted.

Turning now to these drawings, 1 is a resin mold frame, 2 is an optical sheet group (a lower diffusion sheet, two lens sheets, an upper diffusion sheet), 3 is a light guide plate, 4 is a reflection sheet, 5 and 6 are glass substrates, 7 is an upper polarization plate, 8 is a lower polarization plate, 9 and 10 are double-sided tapes, 11 is a semiconductor chip (a driver), 12 is a flexible wiring substrate, 13 is a spacer, 15 is white light-emitting diodes, and 16 is a flexible wiring substrate on which the white light-emitting diodes 15 are mounted.

In the conventional structure example shown in FIG. 8A and FIG. 8B, a liquid crystal display panel, which has the largest mass in the liquid crystal display device, is fixed to the resin mold frame 1 by the double-sided tape 10. Further, the reflection sheet 4 is fixed to the resin mold frame 1 by the double-sided tape 9.

The conventional structure example shown in FIG. 8A and FIG. 8B is a structure where the peripheral portion of the lower glass substrate 6 of the pair of glass substrates 5 and 6 that configure the liquid crystal display panel is fixed to the resin mold frame 1 by the double-sided tape 10 and where the lower polarization plate 8 is dropped into the inside of the resin mold frame 1 (below, called a "lower polarization plate dropped structure"). This lower polarization plate dropped structure is suited to making the liquid crystal display device thin.

The conventional structure example shown in FIG. 9A and FIG. 9B is a structure where the periphery of the lower polarization plate 8 of the liquid crystal display panel is fixed to the resin mold frame 1 by the double-sided tape 10 (below, called a "lower polarization plate fixed structure"). In this structure, the double-sided tape 10 also holds the inside optical sheet group 2. This lower polarization plate fixed structure adheres, while holding from above, the periphery of the optical sheet group 2 to the liquid crystal display panel, so it can deter problems such as ingression of foreign matter into the inside of the optical sheets and shifting of the optical sheets.

SUMMARY OF THE INVENTION

The lower polarization plate dropped structure shown in FIG. 8A and FIG. 8B is suited to making the liquid crystal display device thin, but because the optical sheet group 2 is not fixed as indicated by A in FIG. 8A, there is the potential for foreign matter to ingress between the optical sheets or for the optical sheets to shift between the double-sided tape 10 and the liquid crystal display panel and for this to hinder the adhesion between the liquid crystal display panel and the double-sided tape 10.

Further, the lower polarization plate fixed structure shown in FIG. 9A and FIG. 9B adheres, while holding from above, the periphery of the optical sheets to the liquid crystal display panel, so it can deter sheet-related problems such as ingression of foreign matter into the optical sheets and shifting of the optical sheets, but it is not suited to making the liquid crystal display device thin because the thickness of the double-sided tape 10 is included in the total thickness of the liquid crystal display device.

Further, when the cross-sectional structure on the short side where the semiconductor chip is mounted is taken into consideration, the lower polarization plate fixed structure is a structure where the spacer 13 of a thickness corresponding to the thickness of the lower polarization plate 8 is essential and where it is necessary to dispose a clearance (the portion indicated by A in FIG. 9A) between the spacer 13 and the double-sided tape 10 such that the spacer 13 does not contact the double-sided tape 10 before the lower polarization plate 8 and where adhesiveness of the liquid crystal display panel is extremely bad on the short side where the semiconductor chip is mounted.

The present invention has been made in order to solve the problem of the related art, and it is an object of the present invention to provide a technology by which a liquid crystal display device that employs a lower polarization plate fixed structure can be made thinner than conventionally.

The foregoing and other objects and novel features of the present invention will be made apparent by the description of the present specification and the attached drawings.

To briefly describe an overview of the representative inventions of the inventions disclosed in the present application, it is as follows.

(1) A liquid crystal display device comprises: a liquid crystal display panel that includes a first substrate, a second substrate and liquid crystal that is held between the first substrate and the second substrate; and a backlight that is disposed on the first substrate side of the liquid crystal display panel, wherein the backlight includes a frame-like mold frame, the liquid crystal display panel is adhered to the mold frame by a double-sided tape, the backlight includes an optical sheet that is disposed inside the mold frame, the liquid crystal display panel includes a lower polarization plate on a surface of the first substrate on the mold frame side, the double-sided tape is adhered to a peripheral portion of the first substrate of the liquid crystal display panel on one side and is adhered to the mold frame and a peripheral portion of the optical sheet on the other side, and when A represents the thickness of the double-sided tape and B represents the thickness of the lower polarization plate, A and B satisfy A>B.

(2) In (1), the difference (A−B) between the thickness A of the double-sided tape and the thickness B of the lower polarization plate satisfies 0<(A−B)<50 μm.

(3) In (2), the difference (A−B) between the thickness A of the double-sided tape and the thickness B of the lower polarization plate satisfies 10 μm≦(A−B)<50 μm.

(4) In any of (1) to (3), the mold frame includes a step portion for supporting the first substrate of the liquid crystal display panel, and the double-sided tape is adhered to the step portion of the mold frame and the peripheral portion of the optical sheet on the other side.

(5) In any of (1) to (4), a semiconductor chip is mounted on one side of the liquid crystal display panel where the second substrate is, and the width of the double-sided tape on the one side where the semiconductor chip is mounted is wider than the width of the double-sided tape on the other side.

(6) In any of (1) to (5), the backlight includes light-emitting diodes, and the light-emitting diodes are disposed in regions inside the mold frame that are covered by the double-sided tape.

(7) In (6), the liquid crystal display device includes, between the light-emitting diodes and the double-sided tape, a circuit substrate on which the light-emitting diodes are mounted.

(8) In any of (1) to (7), the double-sided tape is a double-sided tape of a single base material structure where an adhesive layer is formed on both sides of a base material.

(9) In any of (1) to (8), the lower polarization plate is a polarization plate having a reflecting polarization plate.

To briefly describe the effect obtained by the representative inventions of the inventions disclosed in the present application, it is as follows.

According to the present invention, it becomes possible to make a liquid crystal display device that employs a lower polarization plate fixed structure thinner than conventionally.

DETAILED DESCRIPTION OF THE INVENTION

Figure 1A:
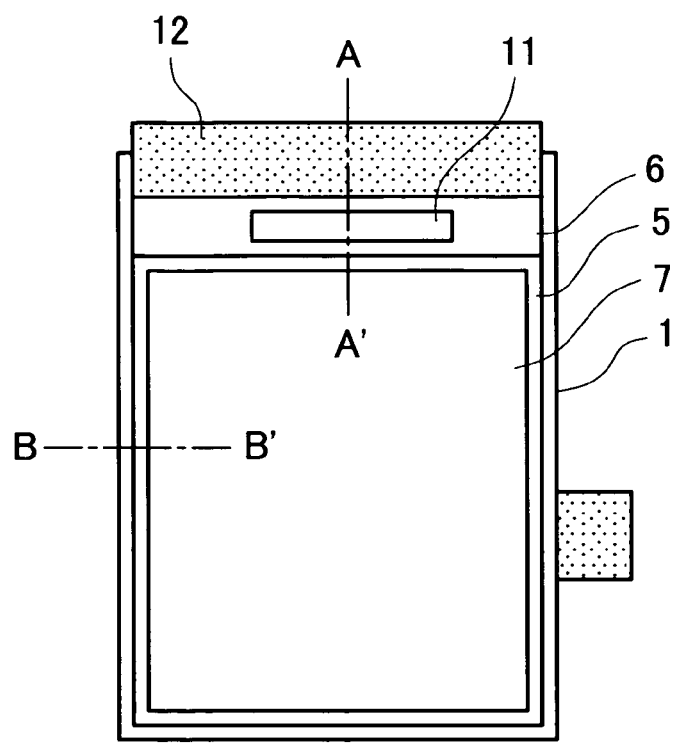
FIG. 1A and FIG. 1B are diagrams for describing a liquid crystal display device of an embodiment of the present invention.

Below, an embodiment of the present invention will be described in detail with reference to the drawings.

It will be noted that, in all of the drawings for describing the embodiment, the same reference numerals will be given to members having the same functions and redundant description of those members having the same functions will be omitted.

A liquid crystal display device of the embodiment of the present invention is a TFT liquid crystal display device that includes a compact liquid crystal panel of about 240×320×3 that is a color display, and the liquid crystal display device is used as a display portion in a mobile device such as a mobile telephone.

The liquid crystal display device of the present embodiment is configured by a backlight and the liquid crystal display panel that is disposed on the backlight.

Figure 1B:
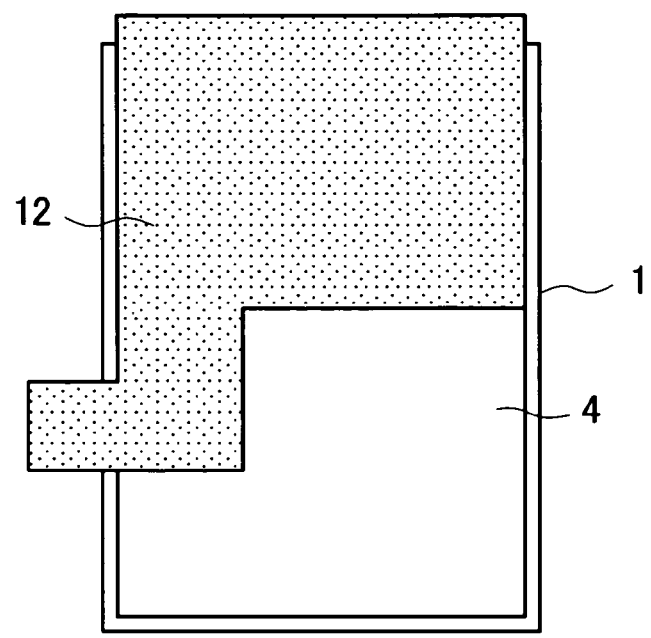
Figure 2:
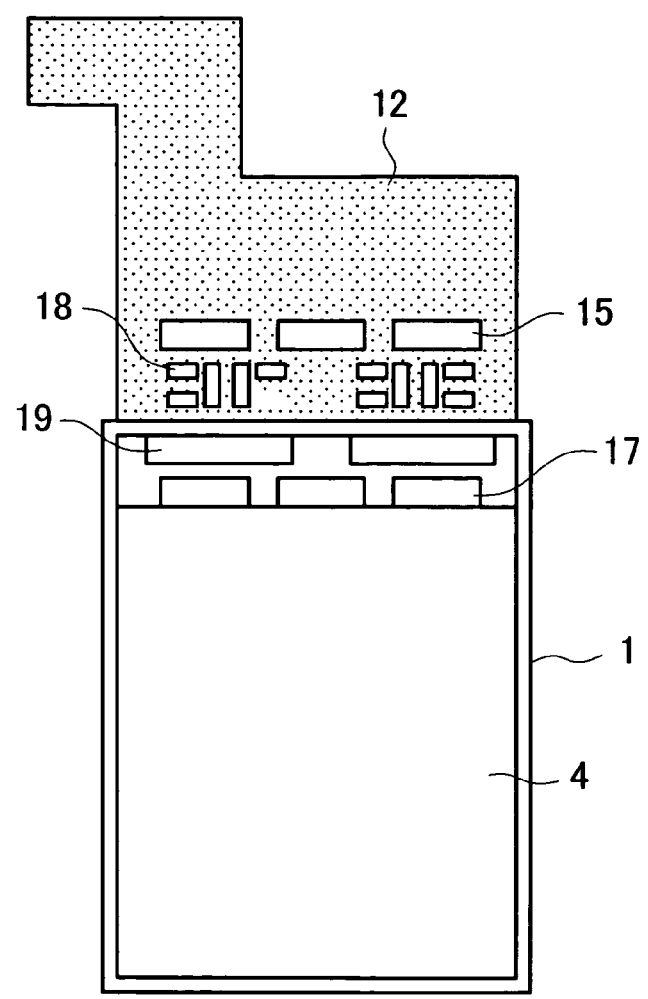
FIG. 2 is a diagram showing a state where an FPC has been opened in FIG. 1B.

FIG. 1A and FIG. 1B are diagrams showing the liquid crystal display device of the present embodiment, with FIG. 1A being a diagram showing the liquid crystal display device as seen from above (a liquid crystal display panel side, a front side, a viewer side) and FIG. 1B being a diagram showing the liquid crystal display device as seen from below (a light guide plate side, a back surface side, a rear side). Further, FIG. 2 is a diagram showing a state where an FPC 12 has been opened in FIG. 1B.

In these diagrams, 1 is a mold (a resin mold frame), 4 is a reflection sheet, 5 and 6 are glass substrates, 7 is an upper polarization plate, 11 is a semiconductor chip that configures a drive circuit, 12 is the flexible wiring substrate (below, called "FPC"), 15 is white light-emitting diodes (light sources), 17 is recessed portions that house the white light-emitting diodes 15, 18 is electronic parts such as resistors and capacitors, and 19 is recessed portions that house the electronic parts.

In the present embodiment, the FPC 12 is routed around (folded) and fixed to the back surface side of the backlight. At this time, the white light-emitting diodes 15 mounted on the FPC 12 become disposed inside the recessed portions 17 formed in the resin mold frame 1 from the back surface side (the backlight side of the liquid crystal display panel).

Moreover, at least some of the electronic parts 18 mounted on the FPC 12 can be housed inside the resin mold frame 1. That is, the recessed portions 19 that open to the back surface side are formed in the resin mold frame 1, and at least some of the electronic parts 18 mounted on the FPC 12 are capable of being housed inside the recessed portions 19. It will be noted that the recessed portions 17 and 19 may also be through holes.

Figure 3:
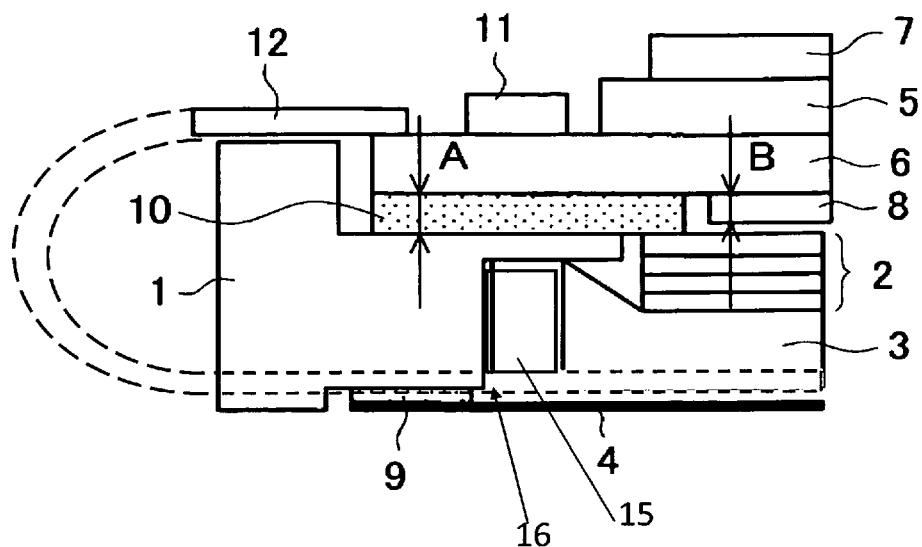
FIG. 3 is a cross-sectional diagram showing a cross-sectional structure along section line A-A' of FIG. 1A.
Figure 4:
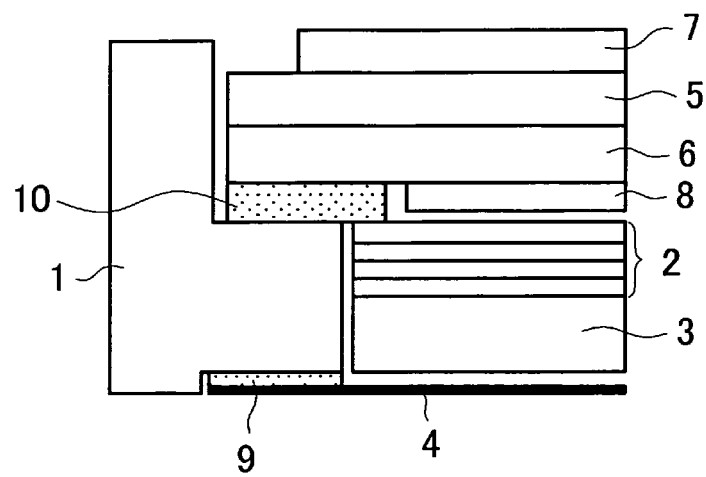
FIG. 4 is a cross-sectional diagram showing a cross-sectional structure along section line B-B' of FIG. 1A.

FIG. 3 is a cross-sectional diagram showing a cross-sectional structure along section line A-A' of FIG. 1A. FIG. 4 is a cross-sectional diagram showing a cross-sectional structure along section line B-B' of FIG. 1A.

Turning now to these diagrams, 2 is an optical sheet group (a lower diffusion sheet, two lens sheets, an upper diffusion sheet), 3 is a light guide plate, 4 is the reflection sheet, 5 and 6 are the glass substrates, 7 is the upper polarization plate, 8 is a lower polarization plate, 9 and 10 are double-sided tapes, and 12 is the FPC.

The backlight of the present embodiment includes the optical sheet group 2 that comprises the lower diffusion sheet, the two lens sheets and the upper diffusion sheet, the light guide plate 3, the reflection sheet 4 that is disposed on the underside of the light guide plate 3, and the white light-emitting diodes 15 that are disposed on a side surface of the light guide plate 3. The backlight of the present embodiment is configured as a result of the optical sheet group 2, the light guide plate 3 and the reflection sheet 4 being disposed inside the resin mold frame 1 in the order shown in FIG. 3 and FIG. 4.

It will be noted that the optical sheet group 2 is not limited to a four-ply configuration as in the present embodiment. For example, the optical sheet group 2 may also have a configuration that uses just one diffusion sheet rather than two diffusion sheets. Further, the optical sheet group 2 may also have a configuration that uses just one lens sheet (prism sheet) rather than two lens sheets. Further, it is also possible to omit the lens sheets by forming grooves in the light guide plate 3 to allow the light guide plate 3 to also function as a lens sheet. Consequently, the optical sheet group 2 may also be one optical sheet. Further, the optical sheet group 2 may also use optical sheets other than diffusion sheets and lens sheets. Because of the above, the optical sheet group 2 may also be replaced by at least one optical sheet.

The white light-emitting diodes 15 are mounted on the FPC 12 and are disposed inside the recessed portions 17 formed in the side surface of the light guide plate 3. Here, the reflection sheet 4 is adhered to the mold 1 by the double-sided tape (adhering member) 9.

The liquid crystal display panel is configured by superposing, with a predetermined clearance being disposed between, the glass substrate (also called a "TFT substrate") 6 on which pixel electrodes and thin-film transistors are disposed and the glass substrate (also called an "opposing substrate") 5 on which color filters are formed, adhering both substrates to each other by a seal material that is disposed in a frame-like manner in the vicinity of the peripheral portion between both substrates, enclosing and sealing liquid crystal inside the seal material between both substrates from a liquid crystal enclosure opening disposed in part of the seal material, and then adhering the upper polarization plate 7 and the lower polarization plate 8 to the outer sides of both substrates.

The present embodiment has a structure where the liquid crystal is held between the pair of substrates. It will be noted that the material of the substrates is not limited to glass as long as the substrates are insulating substrates and may also be plastic or the like. Further, the color filters may also be disposed on the TFT substrate rather than on the opposing substrate. In the case of monochrome pixels, the color filters are not necessary.

Opposing electrodes are disposed on the opposing substrate when the liquid crystal display panel is a TN or VA liquid crystal display panel. In the case of an IPS liquid crystal display panel, the opposing electrodes are disposed on the TFT substrate.

It will be noted that the present invention has no relation to the internal structure of the liquid crystal panel, so detailed description of the internal structure of the liquid crystal panel will be omitted. Moreover, the present invention is applicable to liquid crystal panels of whatever structure.

Figure 5A:
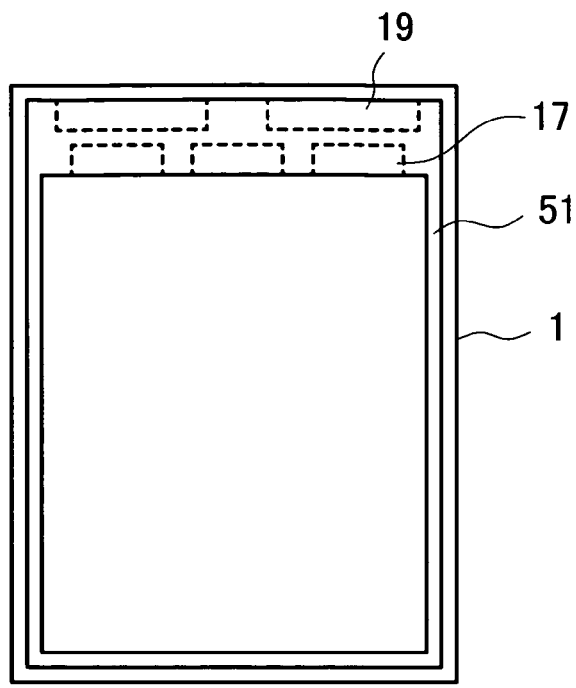
FIG. 5A and FIG. 5B are diagrams for describing the shape of a resin mold frame of the embodiment of the present invention.
Figure 5B:
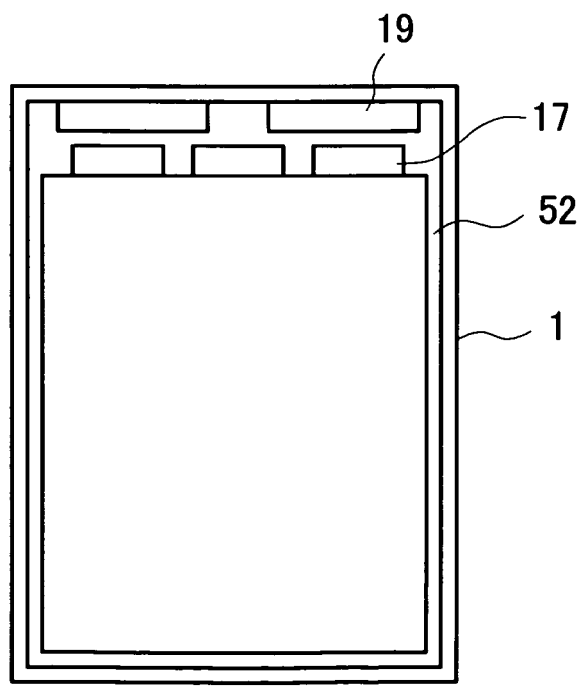

FIG. 5A and FIG. 5B are diagrams for describing the shape of the mold 1 shown in FIG. 1A and FIG. 1B, with FIG. 5A being a diagram showing the mold 1 shown in FIG. 1A and FIG. 1B as seen from above (the liquid crystal display panel side) and FIG. 5B being a diagram showing the mold 1 shown in FIG. 1A and FIG. 1B as seen from below (the light guide plate side).

As shown in FIG. 5A and FIG. 5B, the resin mold frame 1 of the present embodiment has a structure where the bottom surface has been omitted and which includes an open portion in its center portion, that is, a frame-like body (or cylindrical body) whose cross-sectional shape is a substantially quadrilateral shape. For that reason, the reflection sheet 4 is adhered to the back surface side of the frame-like resin mold frame 1.

As shown in FIG. 5A, in the present embodiment, a first step portion 51 for supporting and fixing the peripheral portion of the lower glass substrate 6 of the liquid crystal display panel is formed in the resin mold frame 1. The peripheral portion of the lower glass substrate 6 of the liquid crystal display panel is adhered to the first step portion 51 of the resin mold frame 1 by the double-sided tape 10.

Further, the light guide plate 3 is disposed inside the first step portion 51, and the optical sheet group 2 is supported on the light guide plate 3. Moreover, the reflection sheet 4 is disposed on the underside of the light guide plate 3 so as to cover the open portion of the resin mold frame 1.

The reflection sheet 4 is adhered to a second step portion 52 formed on the undersurface of the resin mold frame 1 by the double-sided tape 9.

Figure 6:
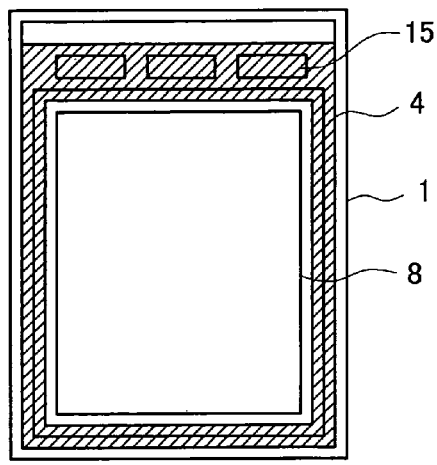
FIG. 6 is a diagram showing the shape of a double-sided tape of the embodiment of the present invention.

FIG. 6 is a diagram showing the shape of the double-sided tape 10 of the present embodiment.

As shown in FIG. 6, the double-sided tape 10 of the present embodiment has a structure that includes an open portion in its center portion, that is, a frame-like body (or cylindrical body) whose cross-sectional shape is a substantially quadrilateral shape. Further, as shown in FIG. 3, the width of the double-sided tape 10 is larger on the one side where the white light-emitting diodes 15 (or the semiconductor chip 11) are disposed than on the other side.

Further, as shown in FIG. 3, FIG. 4 and FIG. 6, the peripheral portion of the glass substrate 6 is adhered to the first step portion 51 of the resin mold frame 1 by the double-sided tape 10. Additionally, in the present embodiment, when A represents the thickness of the double-sided tape 10 positioned outside the lower polarization plate 8 and B represents the thickness of the lower polarization plate 8, A and B satisfy A>B.

Figure 8A:
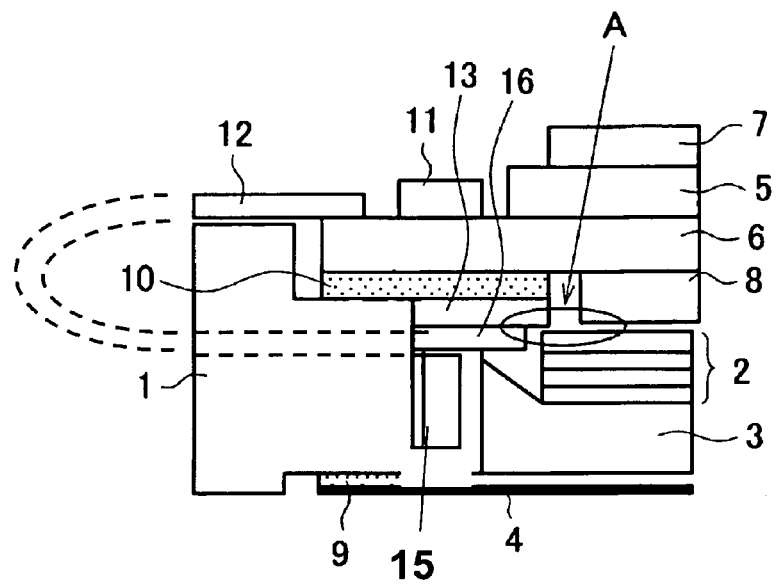
FIG. 8A and FIG. 8B are cross-sectional diagrams of relevant portions showing a conventional structure of a liquid crystal display device.
Figure 8B:
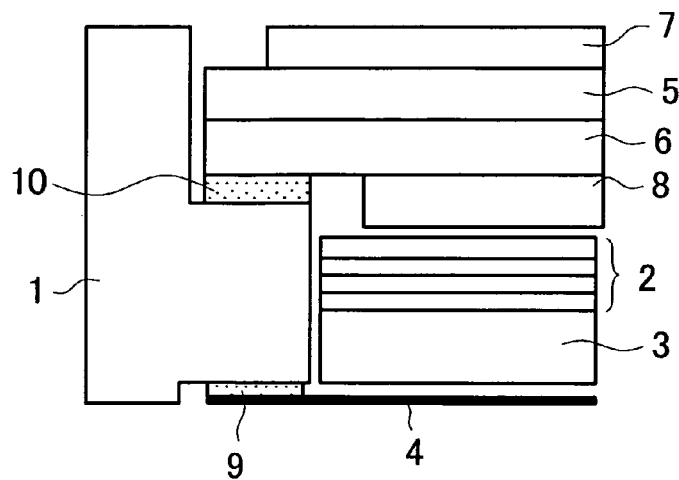
Figure 9A:
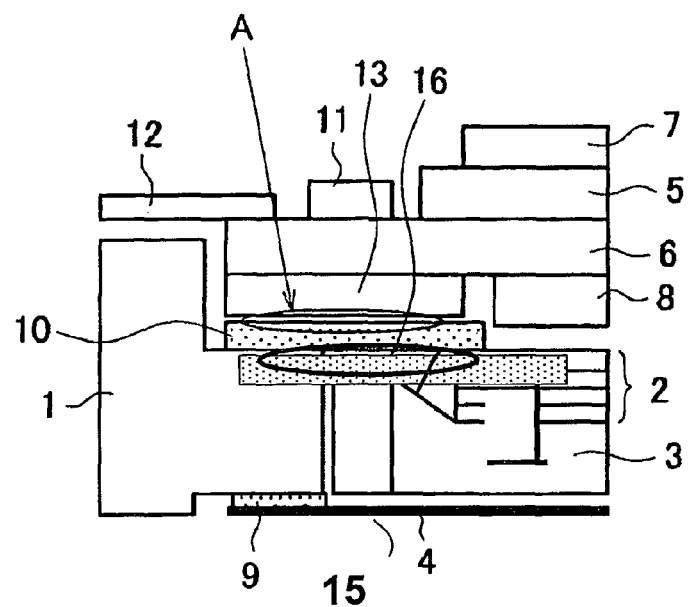
FIG. 9A and FIG. 9B are cross-sectional diagrams of relevant portions showing a conventional structure of a liquid crystal display device.
Figure 9B:
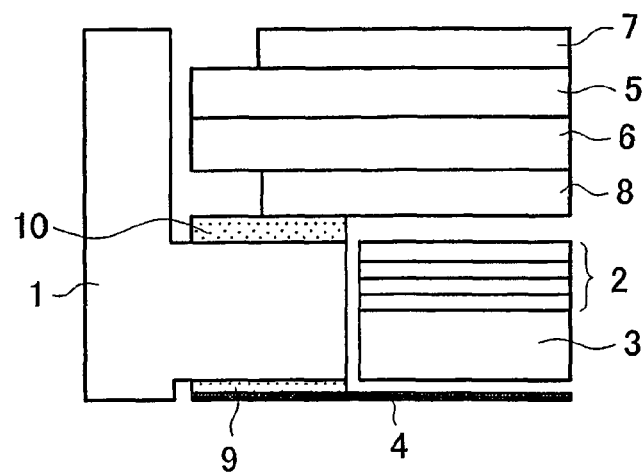

For that reason, the present embodiment has a structure where, similar to the conventional structure example shown in FIG. 8A and FIG. 8B, the peripheral portion of the lower glass substrate 6 is fixed to the resin mold frame 1 by the double-sided tape 10 and where the lower polarization plate 8 is dropped into the inside of the resin mold frame 1.

Consequently, in the present embodiment, it becomes possible to make the liquid crystal display device thin because the percentage by which the thickness of the double-sided tape 10 is included in the total thickness of the liquid crystal display device becomes smaller. Further, in the present embodiment, the adhesiveness of the liquid crystal display panel becomes excellent because the peripheral portion of the lower glass substrate 6 is adhered to the resin mold frame 1 by the double-sided tape 10 and not across the lower polarization plate 8.

Moreover, in the present embodiment, as shown in FIG. 3, FIG. 4 and FIG. 6, the surface of the double-sided tape 10 on the opposite side of the surface connected to the peripheral portion of the glass substrate 6 is adhered to the step portion 51 of the resin mold frame 1 and the peripheral portion of the uppermost optical sheet of the optical sheet group 2.

In this manner, in the present embodiment, the periphery of the optical sheet is adhered, while being held from above, to the resin mold frame 1 and the liquid crystal display panel, so sheet-related problems such as ingression of foreign matter into the optical sheet and shifting of the optical sheet can be deterred.

It will be noted that, as for the maximum value of the difference (A−B) between the thickness A of the double-sided tape 10 and the thickness B of the lower polarization plate 8, when (A−B) is equal to or greater than 50 μm, when foreign matter has ingressed into the inside of the resin mold frame 1 or the optical sheets, the foreign matter moves and display quality is compromised, so it is necessary for (A−B) to be less than 50 μm.

Further, as for the minimum value of (A−B), there is no problem as long as it is larger than 0, but when the manufacturing error of the thickness A of the double-sided tape 10 and the thickness B of the lower polarization plate 8 or (A−B) is close to 0, there are problems such that the workability is deteriorating because the optical sheet group 2 is lifted by static electricity when the liquid crystal display panel is adhered to the resin mold frame 1 by the double-sided tape 10, so it is preferable for (A−B) to be equal to or greater than 10 μm. Consequently, (A−B) satisfies 0<A−B<50 μm and more preferably satisfies 10 μm≦A−B<50 μm.

Further, the double-sided tape 10 may have a single base material structure where an adhesive layer is formed on both sides of a base material, but when the thickness of the double-sided tape 10 is insufficient, the double-sided tape 10 may also have a structure where plural single base materials where an adhesive layer is formed on both sides of a base material are superposed.

Moreover, when the lower polarization plate 8 is a polarization plate having a reflecting polarization plate, it becomes possible to effectively utilize the light that is emitted from the white light-emitting diodes 15.

In this manner, in the present embodiment, a lower polarization plate fixed structure is employed and it becomes possible to make the liquid crystal display device thinner than conventionally.

Figure 7:
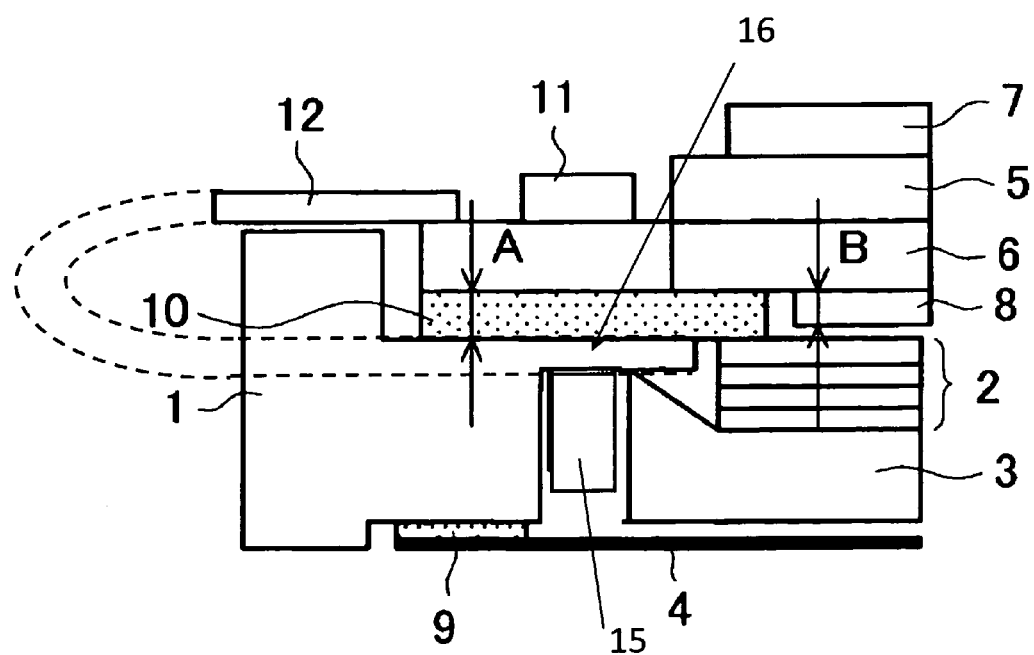
FIG. 7 is a cross-sectional diagram of relevant portions showing a modification of the liquid crystal display device of the present invention.

FIG. 7 is a cross-sectional diagram of relevant portions showing a modification of the liquid crystal display device of the embodiment of the present invention. FIG. 7 is a cross-sectional diagram showing a cross-sectional structure of relevant portions in the same place as FIG. 3.

In the structure shown in FIG. 3, the white light-emitting diodes 15 mounted on the FPC 12 are disposed inside the recessed portions 17 formed in the resin mold frame 1 from the back surface side (the backlight side of the liquid crystal display panel) when the FPC 12 is routed around (folded) and fixed to the back surface side of the backlight.

In contrast, in the modification shown in FIG. 7, the white light-emitting diodes 15 are disposed inside the recessed portions 17 formed in the resin mold frame 1 from the front side (the viewer side of the liquid crystal display panel).

For that reason, the modification shown in FIG. 7 is different from the structure shown in FIG. 3 in that the flexible wiring substrate 16 on which the white light-emitting diodes 15 are mounted is disposed on the white light-emitting diodes 15, but the remaining configuration of the modification shown in FIG. 7 is the same, so redundant description thereof will be omitted.

The invention that has been made by the present inventor has been specifically described above on the basis of the embodiment, but the present invention is not limited to the embodiment and is of course capable of being variously altered in a range that does not depart from the gist thereof.

What is claimed is:

1. A liquid crystal display device comprising:
   a liquid crystal display panel that includes a first substrate, a second substrate and a liquid crystal that is held between the first substrate and the second substrate; and
   a backlight that is disposed on the first substrate side of the liquid crystal display panel, wherein
   the backlight includes a frame-like mold frame,
   the liquid crystal display panel is adhered to the mold frame by a double-sided tape,
   the backlight includes an optical sheet that is disposed inside the mold frame, the liquid crystal display panel includes a lower polarization plate on a surface of the first substrate on the mold frame side,
   wherein the optical sheet is larger than the lower polarization plate,
   the double-sided tape is directly adhered to a peripheral portion of the first substrate which avoids the lower polarization plate of the liquid crystal display panel on one side and is adhered to the mold frame and a peripheral portion of the optical sheet on the other side,
   when A represents the thickness of the double-sided tape and B represents the thickness of the lower polarization plate, A and B satisfy A>B and
   the difference (A−B) between the thickness A of the double-sided tape and the thickness B of the lower polarization plate satisfies 0<(A−B)<50 μm.

2. The liquid crystal display device of claim 1, wherein the difference (A−B) between the thickness A of the double-sided tape and the thickness B of the lower polarization plate satisfies 10 μm≦(A−B)<50 μm.

3. The liquid crystal display device of claim 1, wherein
   the mold frame includes a step portion for supporting the first substrate of the liquid crystal display panel, and
   the double-sided tape is adhered to the step portion of the mold frame and the peripheral portion of the optical sheet on the other side.

4. The liquid crystal display device of claim 1, wherein
   a semiconductor chip is mounted on one side of the liquid crystal display panel where the second substrate is, and
   the width of the double-sided tape on the one side where the semiconductor chip is mounted is wider than the width of the double-sided tape on the other side.

5. The liquid crystal display device of claim 1, wherein
   the backlight includes light-emitting diodes, and
   the light-emitting diodes are disposed in regions inside the mold frame that are covered by the double-sided tape.

6. The liquid crystal display device of claim 5, wherein the liquid crystal display device includes, between the light-emitting diodes and the double-sided tape, a circuit substrate on which the light-emitting diodes are mounted.

7. The liquid crystal display device of claim 1, wherein the double-sided tape is a double-sided tape of a single base material structure where an adhesive layer is formed on both sides of a base material.

8. The liquid crystal display device of claim 1, wherein the lower polarization plate is a polarization plate having a reflecting polarization plate.

* * * * *